US006923054B2

(12) United States Patent
Liu et al.

(10) Patent No.: US 6,923,054 B2
(45) Date of Patent: Aug. 2, 2005

(54) MICROSCALE OUT-OF-PLANE ANEMOMETER

(75) Inventors: Chang Liu, Champaign, IL (US); Jack Chen, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 10/346,565

(22) Filed: Jan. 17, 2003

(65) Prior Publication Data

US 2005/0109102 A1 May 26, 2005

Related U.S. Application Data

(60) Provisional application No. 60/349,431, filed on Jan. 18, 2002.

(51) Int. Cl.[7] .............................................. G01F 1/68
(52) U.S. Cl. ................................ 73/204.27; 73/861.85
(58) Field of Search .................... 73/204.27, 204.26, 73/861.85, 204.11, 204.22, 205.25

(56) References Cited

U.S. PATENT DOCUMENTS

| 4,393,697 A | | 7/1983 | Sato et al. | |
|---|---|---|---|---|
| 4,538,457 A | * | 9/1985 | Gneiss et al. | 73/204.27 |
| 4,604,895 A | * | 8/1986 | Watkins | 73/204.27 |
| 4,864,855 A | | 9/1989 | Shiraishi et al. | |
| 5,020,365 A | * | 6/1991 | Gneiss | 73/204.27 |
| 5,024,083 A | * | 6/1991 | Inada et al. | 73/204.26 |
| 5,148,707 A | * | 9/1992 | Inada et al. | 73/204.26 |

OTHER PUBLICATIONS

Z. Fan, J. Chen, J. Zou, D. Bullen, C. Liu, F. Delcomyn, "Design and Fabrication of Artificial Lateral-Line Flow Sensors," Journal of Micromechanics and Microengineering, vol. 12, No. 5, pp. 655-661, Sep. 2002.

Y. Ozaki, T. Ohyama, T. Yasuda, I. Shimoyama, "An air flow sensor modeled on wind receptor hairs of insects," Proc. MEMS 2000, pp. 1-6, Miyazaki, Japan.

F. Jiang, Y.C. Tai, C.M. Ho, and W.J. Li, "A Micromachined Polysilicon Hot-Wire Anemometer," Technical Digest, Solid-State Sensor and Actuator Workshop, Hilton Head Island, SC, Jun. 13-26, pp. 264-267, 1994.

T. Ebefors, E. Kalvesten, G. Stemme, "Three Dimensional Silicon Triple Hot Wire Anemometer Based on Polyimide Joints" Proc. MEMS '98, pp. 93-98, 1998.

D. Dittmann, R. Ahrens, Z. Rummler, K. Schlote-Holubek, and W.K. Schomburg, "Low-cost flow transducer fabricated with the AMANDA-process," 11th International Conference on Solid-State Sensors and Actuators, Munich, Germany, Jun. 10-14, pp. 1472-1475, 2001.

(Continued)

*Primary Examiner*—Harshad Patel
(74) *Attorney, Agent, or Firm*—Greer, Burns, & Crain, Ltd.

(57) ABSTRACT

A microscale out-of-plane thermal sensor. A resistive heater is suspended over a substrate by supports raised with respect to the substrate to provide a clearance underneath the resistive heater for fluid flow. A preferred fabrication process for the thermal sensor uses surface micromachining and a three-dimensional assembly to raise the supports and lift the resistive heater over the substrate.

25 Claims, 8 Drawing Sheets

OTHER PUBLICATIONS

HD Microsystems, "Pyralin Polyimide Coating for Electronics: P12610 Series—Product Information and Process Guidelines," HD Microsystems, Jul. 1998.

F. Jiang, Y.C. Tai, C.M. Ho, R. Karan, and M. Garstenauer, "Theoretical and Experimental Studies of Micromachined Hot-Wire Anemometers," Technical Digest, International Electron Devices Meeting (IEDM), San Francisco, 1994, pp. 139-142.

T. Neda, K. Nakamura, and T. Takumi, "A Polysilicon Flow Sensor For Gas Flow Meters," Sensors and Actuators A-Physical, vol. A54, No. 1-3, pp. 621-631, Jun. 1996.

J. Zou, J. Chen, C. Liu, and J.E. Schutt-Aine, "Plastic Deformation Magnetic Assembly (PDMA) of Out-of-Plane Microstructures: Technology and Application," IEEE/ASME Journal of Micro Electromechanical Systems, vol. 10, No. 2, pp. 302-309, Jun. 2001.

A.F. Mayadas, M. Shatzkes and J.F. Janak, "Electrical Resistivity Model For Polycrystalline Films: The Case of Specular Reflection at External Surfaces." Applied Physics Letters, vol. 14, p. 343-347, 1969.

S. Sedky et al., "Experimental Determination of the Maximum Post-Process Annealing Temperature for Standard CMOS Wafers," IEEE Transactions on Electron Devices, vol. 48, No. 2, pp. 377-385, 2001.

J. Chen, J. Zou, and C. Liu, " A Surface Micromachined, Out-of-Plane Anemometer," Proceedings MEMS, Las Vegas, 2002, pp. 332-335.

S.A. Chambers and K.K. Chakravorty, " Oxidation at the Polyimide/Cu Interface," Journal of Vacuum Science and Technology A—Vacuum Surfaces & Films, vol. 6, No. 5, pp. 3008-3011, Sep. 1988.

Y. Nakamura, Y. Suzuki, and Y. Watanabe, " Effect of Oxygen Plasma Etching on Adhesion Between Polyimide Films and Metal," Thin Solid Films, vol. 290, pp. 367-369, 1996.

P.D. Weidman and F.K. Browand, " Analysis of a Simple Circuit for Constant Temperature Anemometry," Journal of Physics E—Scientific Instruments, vol. 8, No. 2, pp. 553-560, Jul. 1975.

* cited by examiner

MICROSCALE OUT-OF-PLANE ANEMOMETER

PRIORITY CLAIM

This application claims priority of U.S. Provisional Application Ser. No. 60/349,431, filed Jan. 18, 2002 under 35 U.S.C. § 119.

STATEMENT OF GOVERNMENT INTEREST

This invention was made with Government assistance under National Science Foundation Grant No. NSF IIS 99-84954, National Aeronautics and Space Administration Grant No. NASA NAG 5-8781, and National Science Foundation Grant No. NSF IIS-0080639. The Government has certain rights in the invention.

FIELD OF THE INVENTION

A field of the invention is sensing. Other fields of the invention include microelectronics and micro-electromechanical systems.

BACKGROUND OF THE INVENTION

Measuring fluid flow velocity is useful for turbulence flow measurement in fluid mechanics research, and any industrial application where flow measurement is required, such as, but not limited to, gas metering and air duct monitoring. Commercial flow sensors are mainly based on one of two principles: thermal anemometry and laser-Doppler velocimetry. A thermal anemometer is a common type of commercial flow sensor for measuring the velocity of fluid flow. A typical type of thermal anemometer, often referred to as a "hot-wire anemometer", utilizes a resistive heater (a "hot wire") that serves as both a Joule heater and a temperature sensor. Monitoring the resistance of the resistive heater as current is passed through determines the temperature of the element.

Under a constant bias power and zero flow rate, the temperature of the resistive heater reaches a steady-state value. As flow of a fluid media passes the resistive heater, heat is transferred from the element to the fluid media via forced convection, thus reducing the temperature of the sensor. The flow speed is derived indirectly from the temperature variation from steady state values. Accordingly, the temperature of the resistive heater provides a means to gauge the cooling rate of the element and the flow velocity.

A conventional hot-wire anemometer includes a thin wire made of platinum or tungsten that is supported by prongs and mounted on a probe having a suitable electrical connection. This thermal sensor provides a fast response (in the kilohertz range), with low noise. The sensor also can be made relatively small and inexpensively.

However, conventional hot-wire anemometers suffer from significant shortcomings. One such shortcoming is that the fabrication process is delicate and may not result in uniform performance. Another problem is that it may be prohibitively difficult to form large arrays of the anemometers for measuring flow distribution, for example.

Micromachined anemometers have been used by those in the art to realize a thermal sensor with smaller dimensions, better uniformity, faster frequency response, and lower cost of production (via the batch processing nature of micromachining, for example). They also provide the ability to perform applications such as, but not limited to, flow field measurement. Conventional micromachined anemometers have been produced using a bulk micromachining technique, resulting in free-standing cantilevered structures within substrates. For example, doped polycrystalline silicon may be used to make prongs and resistive heaters by bulk micromachining. To create a significant distance between the resistive heater and the substrate, thus increasing thermal insulation to the substrate and increasing the sensitivity, the cantilevered structures are formed by at least partially removing the silicon substrate.

However, bulk micromachining incurs significant cost and restricts the type of substrate that can be used. For example, the doping of silicon (to create the resistive heater, for example), the etching of the silicon, and the packaging of individual silicon dies require significant expertise and effort. Additionally, most micromachined hot-wire anemometers cannot be realized effectively in a large array format. Furthermore, bulk micromachining requires significant etching time, and bulk etching using anisotropic wet etchants frequently poses concerns of materials compatibility, as all materials on a given substrate are required to sustain wet etching for long periods (several hours to etch through typical silicon wafers, for example).

Also, many other types of devices use doped polysilicon thin film as the material for the resistive heater. However, polysilicon deposition and annealing require a high-temperature process and generally preclude the use of substrates with a low melting point.

Certain microscale hot-wire anemometers use surface micromachining for a simpler fabrication process. However, the resistive heater employed is typically located directly on the substrate or very close to it. This leads to a slower frequency response and reduced sensitivity.

SUMMARY OF THE INVENTION

The present invention provides, among other things, a thermal sensor on a substrate for measuring fluid flow. The thermal sensor includes a resistive heater suspended above the substrate by supports. The supports are connected to the substrate, either directly or indirectly, and are raised at a sufficient angle with respect to the substrate to create a clearance between the resistive heater and the substrate for fluid flow. The substrate may be of various materials, and is not limited to a silicon substrate. Furthermore, the thermal sensor is not limited to doped polysilicon, but rather can include a metal thin film.

A method of fabrication for a thermal sensor on a substrate is also provided. A sacrificial layer is formed on the substrate, and a metal thin film is patterned to form a sensing element. At least one support for the sensing element is patterned. The sacrificial layer is removed, and the sensing element is lifted away from the substrate by raising the supports, thus creating a clearance between the sensing element and the substrate to allow fluid flow between the sensing element and the substrate. The supports are raised preferably by use of a magnetic field applied to magnetic material patterned on the supports.

Additionally, a chip for measuring fluid flow is provided according to the present invention. The chip includes a substrate, a thin film metal hot-wire sensor, and a pair of supports raising the thermal sensor and suspending the sensor over the substrate to create a clearance between the sensor and the substrate.

DETAILED DESCRIPTION OF THE INVENTION

Figure 1:
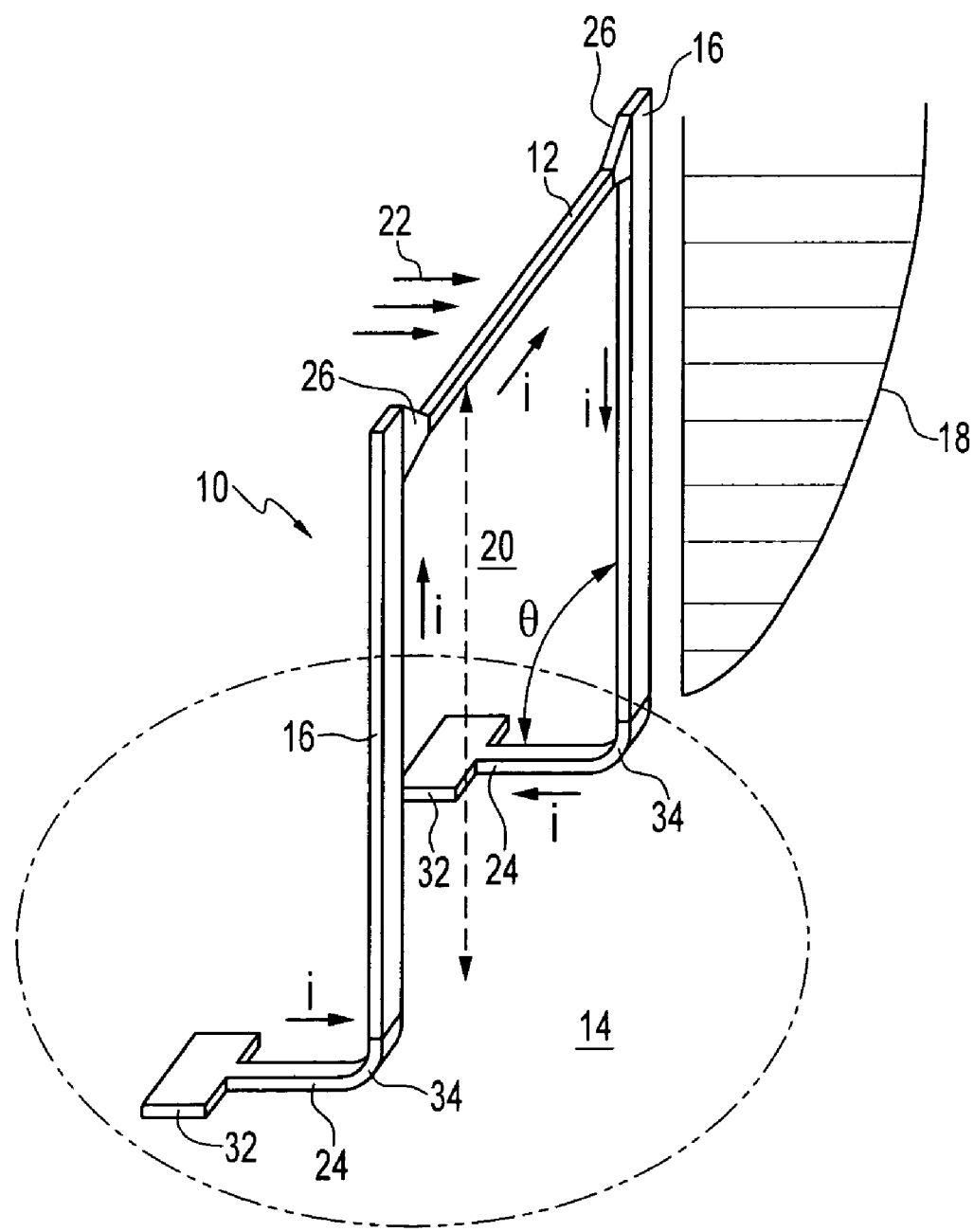
FIG. 1 is a schematic perspective view of a preferred embodiment thermal sensor disposed on a substrate.

The present invention provides, among other things, a microscale thermal sensor produced on a substrate by surface micromachining. The thermal sensor provided on a substrate includes a resistive heater, preferably containing a thin film, suspended above the substrate by supports attached at one end to the substrate, either directly or indirectly. The thin film is produced from temperature-sensitive, electrically conductive material. As opposed to conventional microscale anemometers, the present thermal sensor allows non-silicon materials to be used for the resistive heater and/or the substrate. Furthermore, it is preferred that the resistive heater including the thin film be made of a non-silicon material, such as a metal.

The supports are raised at an angle with respect to the substrate to suspend the resistive heater, preferably creating a clearance underneath the resistive heater for flow of a fluid media. The clearance may be defined, for example, by the resistive heater, the substrate, and the supports. The supports preferably suspend the resistive heater at opposing ends of the element.

The supports preferably include cantilevered prongs formed from a ductile metal beam, such as gold, so that the support can bend about a bending region or hinge, plastically deforming when lifted so that the support remains in a raised position after the lifting process concludes. The supports preferably further include a polymer structural support, such as a polyimide support beam, to provide structural rigidity to the supports. If the metal beam is conductive, the supports can also serve as electrical leads for the resistive heater.

The film for the resistive heater preferably includes metals such as nickel and/or platinum. A polyimide structural support layer may also overlap the film and form part of the resistive heater, providing structural support for the resistive heater. A chrome layer may also be present to adhere the polyimide layer to the film. The resistive heater may have various shapes, including a straight line, wave-like shapes (square wave, for example, or tooth), etc.

Because the resistive heater is preferably raised away from the immediate velocity boundary layer next to the substrate, higher flow speed and convection heat-transfer rate is experienced by the resistive heater. This improves the sensitivity and response time of the thermal sensor. Additionally, the raised thermal sensor provides increased thermal insulation from the substrate.

The types of substrates on which the thermal sensors are produced may vary, due at least in part to the surface micromachining fabrication process. Surface micromachining also enables more efficient assembly and allows formation of large arrays of thermal sensors. Furthermore, because the resistive heaters are preferably realized using non-silicon materials, the fabrication process can be realized in a more efficient and less costly manner.

Three-dimensional assembly methods are preferably used in conjunction with the surface micromachining to produce the thermal sensors of the present invention. This circumvents the use of bulk micromachining. The preferred three-dimensional assembly method pairs magnetic actuation with deformable metal hinges of the supports to fabricate a thermal sensor using surface micromachining of preferably metal and polymer materials. The magnetic actuation preferably includes application of a magnetic field to a ferromagnetic layer formed on the thermal sensor.

Preferably, the maximum temperature required throughout the process flow is under 350° C., but this temperature may vary, and may be even lower, such as, but not limited to, below 200° C. By limiting the overall process temperature, the preferred fabrication process can be run on a broad range of substrates including, but not limited to, silicon, glass, and plastics. The chosen substrate's glass transition temperature ($T_G$) should be higher than the maximum processing temperature. Otherwise, the substrate choices may vary widely.

It is also preferred that no etching using concentrated hydrofluoric (HF) acid be necessary. This is beneficial for at least the reason that concentrated HF (a commonly used sacrificial-layer etching solution in silicon-based surface micromachining) is prone to attack the interface between a hot wire and its support structure. Heretofore, solutions to this problem have added significant process control complexity.

Referring now to the drawings, FIG. 1 shows a preferred embodiment thermal sensor 10. The thermal sensor 10 includes a resistive heater 12 that is elevated; i.e., suspended, above a substrate 14, supported by a plurality (as shown, two) of supports 16. Preferably, the height of the resistive heater 12 above the substrate 14 is predetermined, and corresponds (though not necessarily equates) to the length of the supports 16. The predetermined support length and therefore the resistive heater 12 height above the substrate is preferably decided according to, for example, the type of flow (laminar vs. turbulent, for example), velocity of flow, roughness of the surface, etc. As shown in FIG. 1, the supports 16 are raised at an angle θ to the substrate 14, preferably between 10° and 170°, and most preferably about 90°, to elevate the resistive heater 12. Other angles for the supports 16 between 0 and 180° are possible as well, by changing the orientation of the magnetic field. By elevating the resistive heater 12 away from the bottom of a velocity boundary layer of the substrate 14, the resistive heater experiences greater fluid flow velocity, as shown in flow velocity profile 18, and exhibits greater sensitivity. The raised resistive heater 12 and the substrate 14 (and preferably the supports 16 as well) collectively define a clearance 20 for fluid flow, allowing a fluid media (illustrated at 22) to flow through the clearance, as well as above the resistive heater.

The supports 16 are preferably in the form of first and second cantilevered prongs 16 attached at one end such as a base 24 to the substrate 14, supporting the resistive heater 12 at first and second opposing ends 26 of the element. The first and second prongs 16 preferably include a metal beam 28 (see FIG. 2I), such as, but not limited to, gold or aluminum, for electrical conduction and mechanical resiliency for raising the thermal sensor 12 from the substrate 10. Preferably, any ductile metal that conducts electricity may be used, as long as the resistance of the filament of the resistive heater 12 is significantly (a few orders of magnitude, for example) larger than the metal beam 28. Each of the first and second prongs 16 may, but not necessarily, also include a polyimide support beam 30 for mechanical support of the prongs. Preferably, the resistive heater 12 is electrically coupled to other components through the prongs 16, so that the prongs provide both a mechanical and electrical connection for the resistive heater. Conductive paths may be created from the prongs 16 to other components during fabrication.

Pads 32, of any suitable material or materials with good adhesion to the substrate 14, such as, but not limited to, gold and chrome, are preferably provided at or near the base 24 of each of the prongs 16 for providing mechanical support for the prongs to the substrate 10, to account for shear stress due to fluid flow. A bending joint 34 is created for each of the supports 16 near the base 24 of the supports, where the supports begin to raise from the substrate 14. The bending joints 34 may be reinforced by electroplating nickel, for example, to enhance the rigidity of the thermal sensor 10.

As opposed to the doped polysilicon hot-wire elements of conventional anemometers, the resistive heater 12 of the present invention may and preferably does include a non-silicon material such as, but not limited to, a thin film metal 40 (FIG. 2I) or filament, having a high temperature coefficient of resistance (TCR). A polymer piece 42, such as a polyimide support beam, may also be present to provide additional structural integrity to the resistive heater 12. Also, at least in part because the thermal sensor 10 is produced using surface micromachining, the thermal sensor may be implemented on various substrates 14. Particularly, a non-silicon substrate 14 is used, including but not limited to flexible and/or curved substrates. However, the low processing temperature available and preferably used in fabrication of the thermal sensor 10 according to a preferred method allows the thermal sensor to be built on top of an integrated circuit substrate as well, without affecting the transistor property of the circuit.

Figure 6:
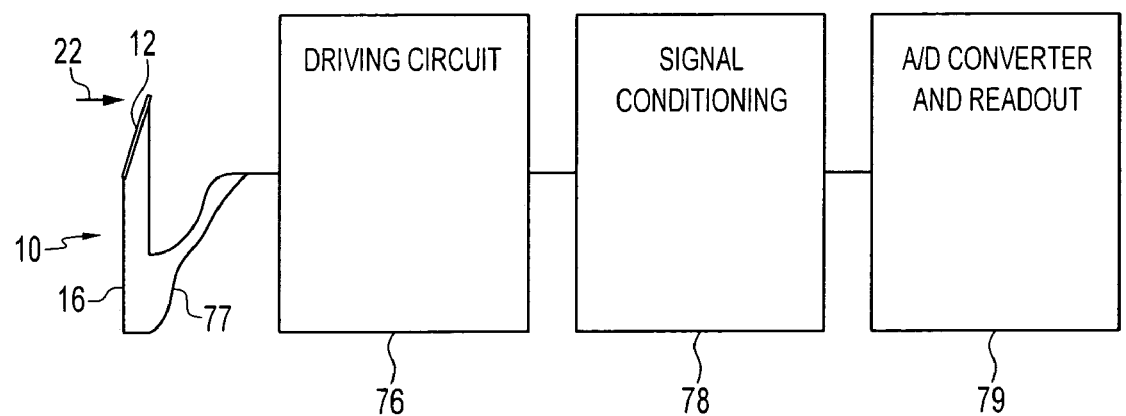
FIG. 6 is a diagram of a fluid flow measurement system including a thermal sensor.

A hot-wire anemometer such as the thermal sensor 10 of the present invention operates by sensing temperature change of the resistive heater 12 resulting from forced convection. The temperature variation can be inferred by the change of the resistance of the thin film 40 as a current i (FIG. 1) passes through the supports 16 and the resistive heater 12. A suitable current source 76 (FIG. 6) may be provided to supply the current i to the resistive heater 12. The heat balance equation for the resistive heater 12 under electrical Joule heating is $$Q_s = Q_{gen} - Q_{conv} - Q_{cond},$$

where $Q_s$ is the rate of heat storage, $Q_{gen}$ is the generated (bias) power from Joule heating, $Q_{conv}$ is the rate of heat loss due to forced convection, and $Q_{cond}$ represents the sum of conductive losses (e.g., through the supports). For a hot-wire anemometer, the term $Q_{cond}$ involves both loss from the ends 26 of the resistive heater 12 through the supports 16, as well as longitudinal thermal conduction along the resistive heater. Under a given set of bias power ($Q_{gen}$) and fluid flow rate, it is important to maximize $Q_{conv}$ while minimizing $Q_{cond}$ in order to obtain greater sensitivity to velocity changes. To minimize the conductive heat loss also means that the thermal sensor 10 can be operated in a more thermally efficient manner. This is especially important if an array of sensors is used. Accordingly, the thermal sensor 10 of the present invention reduces the end loss by supporting the resistive heater 12 using supports 16 raised out-of-plane that have a high aspect ratio and a small cross-section, creating a relatively large thermal resistance. The range of aspect ratios and cross-sections may vary, as there is a design trade-off between thermal insulation and mechanical rigidity. Furthermore, regarding thermal resistance, a trade-off also exists between electrical and thermal resistance.

One significant design parameter is the length of the resistive heater 12. It is possible to increase $Q_{conv}$ by increasing the length of the resistive heater 12, because $Q_{cond}$ varies slowly with the element length, whereas the value of $Q_{conv}$ changes roughly linearly with respect to the length. However, the length of the element 12 may be limited by fabrication practicality and yield considerations. The longer the resistive heater 12, the more difficult it may be to realize.

Another design parameter is the diameter of the cross-section of the resistive heater 12. In the case that the resistive heater 12 has a rectangular cross-section, the equivalent diameter that yields the cross-sectional area may be considered. By reducing the value of the cross-section, the surface-to-volume ratio of the resistive heater 12 is increased, thus encouraging more convection while confining the conductive component. However, there exists a practical limit to the minimal diameter of the resistive heater 12 as well, due to mechanical rigidity concerns.

In particular embodiments of the thermal sensor 10, devices include resistive heater 12 lengths of 50 µm, 100 µm, 150 µm, and 200 µm, preferably between about 10 µm and on the order of millimeters, and heights of the supports 16 of up to on the order of a few millimeters. A preferred embodiment of the resistive heater 12 is a 1200-angstroms-thick metal thin film 40 (but preferably within a range of hundreds of angstroms (so that the film exhibits a sufficient TCR) up to several microns thick) overlapping with the polyimide piece 42, though other polymers may be used. A preferred cross-section of the polyimide piece 42 is 6 µm wide by 2.7 µm thick. The polyimide piece 42 provides additional mechanical support for the effective thin film metal 40. If the polyimide piece 42 thickness is much lower than 2.7 µm (though it is possible), the mechanical rigidity will likely be degraded. However, if the thickness is too great, the polyimide beam 42 may decrease the frequency response of the thermal sensor 10 due to added thermal mass.

According to a preferred embodiment thermal sensor 10, the cross-section of the resistive heater 12 is comparable to that of commercially available hot-wire sensors. The surface micromachining process of a preferred fabrication method of the present invention allows good control of the dimensions of the resistive heater 12.

A preferred method for fabricating the thermal sensor 10 of the present invention will now be described with reference to FIGS. 2A–2I. A material for the metal thin film 40 is chosen that provides a high temperature coefficient of resistance (TCR). A preferred primary material for the metal thin film 40 of the resistive heater 12 is nickel, as it has an effective TCR as a deposited thin film. Though other materials, such as platinum, may be used, these materials may exhibit a reduced effective TCR due to, among other things, a higher-than-expected electrical resistivity attributable to electron scattering at the grain boundary. Though the boundary scattering can be modified by, for example, annealing to increase grain size, the annealing temperature in some cases (for Pt, above 600° C.) may be incompatible with integrated circuits and/or the polyimide film 42 used with the metal thin film 40 in the preferred thermal sensor 10.

The resistive heater 12 includes the temperature-sensitive non-silicon (preferably metal) thin film 40 preferably overlapped by the supporting polymer piece 42. The preferably polyimide polymer piece 42 is used for at least the reason that it provides the resistive heater 12 with structural rigidity without significantly increasing cross-sectional area and thermal conductivity. The thermal conductivity of polyimide is almost two orders of magnitude lower than that of a metal such as nickel.

A preferred fabrication process uses a three-dimensional assembly method that utilizes a surface micromachined structure (such as the thermal sensor 10) anchored to substrates with cantilever beams made of ductile metal materials (for example, gold and aluminum). The ductile metal cantilever beams are the supports 16 in the present thermal sensor 10. Pieces of electroplated ferromagnetic material, such as Permalloy, are attached to the supports 16. By applying an external magnetic field $H_{ext}$, the ferromagnetic material is magnetized and interacts with the field, producing a torque to bend the supports 16 out-of-plane with respect to the substrate 14. Once the supports 16 are sufficiently bent, the cantilever bending joints 34 are plastically deformed, resulting in permanently bent supports even after the magnetic field $H_{ext}$ is removed. This magnetic assembly process may be realized in parallel on the wafer scale, for example.

Figure 2A:
FIGS. 2A–2I are schematic side views showing steps in a preferred process of fabricating a thermal sensor on a chip.

Referring now to FIG. 2A, the process begins with a starting wafer for the substrate 14 such as silicon, glass, polymer, etc. Because the preferred process has a relatively low overall temperature, the process can be performed on substrates 14 in addition to silicon. For example, the thermal sensor 10 may be formed on a flexible polymer substrate or other flexible, even curved, substrates for conformal coating of fluid dynamic surfaces of interest.

A sacrificial layer 60 is evaporated and patterned on the substrate 14. Preferably, a chrome/copper/titanium stack is used for the sacrificial layer 60. More precisely, a chrome film (about 10-nm thick) preferably serves as an adhesion layer between the remainder of the sacrificial layer 60 and the substrate 14. A titanium (about 250-angstroms thick) thin film of the sacrificial layer 60 reduces in-process oxidation of a copper film, which itself is preferably about 2500-angstroms thick. Other materials for the sacrificial layer may be used, for example, aluminum, so long as the material chosen can withstand the process temperature chosen and the etchant of the sacrificial layer does not significantly affect the other materials.

Figure 2B:

Next, as shown in FIG. 2B, a preferably photo-definable polymer 62 such as polyimide is spun-on, preferably about 2.7 $\mu$m thick, patterned via lithography, and cured, for example at 350° C. for about two hours. The polymer layer 62, as previously described, forms part of the supports 16, including the base 24 and raised prongs (defined by, for example, the portion covering the sacrificial layer 60) and part of the resistive heater 12.

Figure 2C:

A Cr/Pt/Ni/Pt film 64 is then evaporated and patterned to complete the thin film 40 of the resistive heater 12 (FIG. 2C). A preferred thickness of the Cr layer (an adhesion layer) of the film 40 is about 200 angstroms. For the remainder of the thin film 40, an 800-angstrom-thick nickel film forming the resistor is sandwiched between two opposing 200-angstrom-thick platinum films, which are used to reduce possible oxidation of the nickel resistor while in operation because platinum is relatively inert at high operation temperatures. However, other high TCR materials may be used for the thin film.

Figure 2D:
Figure 2E:
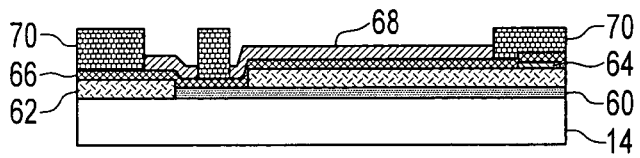
Figure 2F:
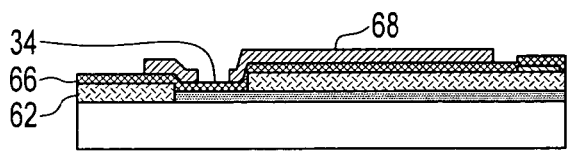

Next, a Cr/Au film 66, preferably about 5000-angstroms thick is evaporated and patterned (FIG. 2D). The Cr/Au film 66, as part of the supports 16, serves as a mechanical bending element as well as electrical leads of the resistive heater 12. Other ductile, conductive metals may be used. A ferromagnetic material 68, such as Permalloy, is then electroplated (preferably, about 4 $\mu$m-thick), using a photoresist mold 70, on portions of the cantilever support prongs 16 formed by the Cr/Au film 66 (FIG. 2E). The photoresist is removed (FIG. 2F), leaving the bending joint 34 exposed for the three-dimensional assembly process.

Figure 2G:
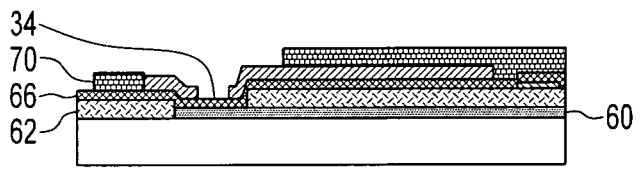
Figure 2H:
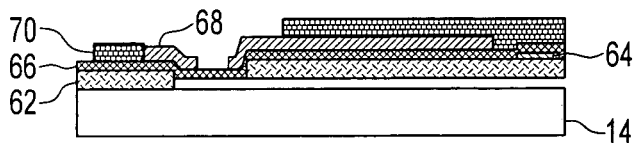
Figure 2I:
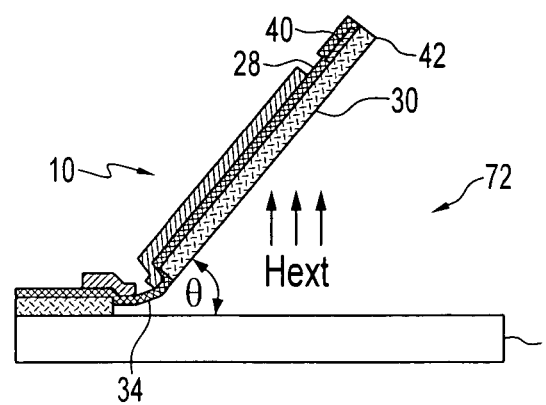

In one embodiment, and referring to FIG. 2H, a release of the sacrificial layer 60 is then performed by using a solution containing acetic acid and hydrogen peroxide, for example, to selectively remove the copper (adhesive) thin film of the sacrificial layer. Next, a magnetic field $H_{ext}$ is applied, for example by a permanent magnet (preferable field strength of 800 Gauss) at the bottom of the substrate 14. The applied magnetic field lifts the resistive heater 12 out-of-plane by bending the cantilevered supports 16, rotating them about the bending joint 34 and away from the substrate 14 at an angle $\theta$ (FIG. 2I). Other methods to apply the magnetic field $H_{ext}$, such as electromagnets, may be employed. Finally, a chip 72 including the substrate 14 and the thermal sensor 10 is rinsed in deionized water and dried.

The adhesion between the (preferably gold) metal beam of the supports 16 and the polyimide support layer is significant, as the adhesion helps to reduce the likelihood of separation during the three-dimensional assembly step (FIG. 2I). One preferred method of improving adhesion is to use a Cr layer as an adhesion layer as described above and also to treat the polyimide layer 62 by using $O_2$ reactive ion etching (RIE) before the deposition of the metal (gold) layer 66. By employing the RIE treatment, a hydrophilic structure is created on the polyimide layer 62 surface that enhances adhesion. Cr is preferred for the adhesion layer, as other materials, such as titanium, though having good stability in chemical etchants and higher electrical resistivity, may allow the metal layer 66 to peel off from the polyimide 62 during the three-dimensional assembly.

Both the resistive heater 12 and the supports 16 preferably have relatively small frontal areas. The momentum thus imparted by fluid on the thermal sensor 10 is minimal. Accordingly, a preferred thermal sensor 10 can withstand airflow with a mean stream velocity lower than 5 m/s without being damaged. However, at such velocity the supports 16 may vibrate. Because the thermal sensor 12 is preferably at least partially immersed in the velocity boundary layer, it is possible to develop sensors that can withstand high flow velocity by lowering its height and fully immersing the thermal sensor in the boundary layer.

Figure 3A:
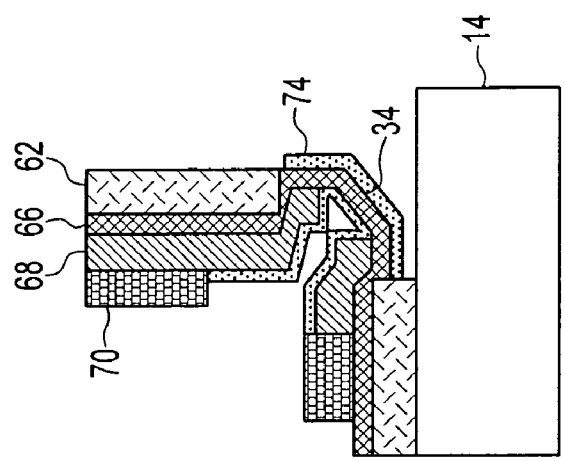
FIGS. 3A–3C are schematic side views showing steps in a preferred process of electroplating a bending region of a thermal sensor.
Figure 3B:
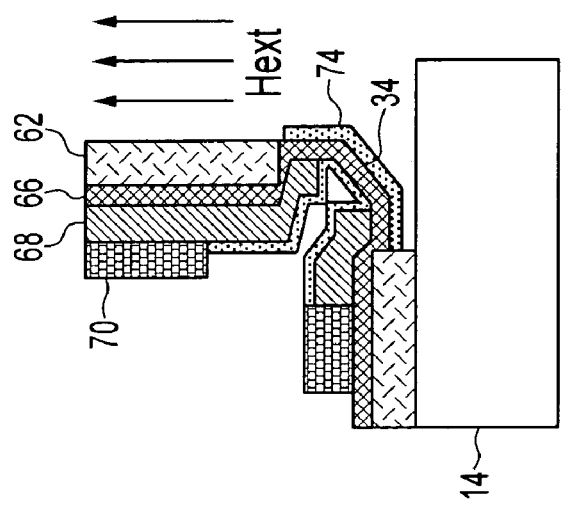
Figure 3C:
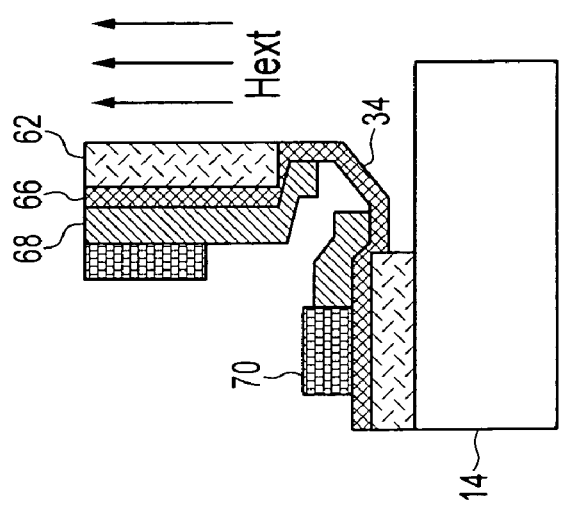

For certain applications, it may be advantageous to strengthen the bending region 34 (hinge) of each of the supports 16 so that the thermal sensor 10 can operate at (i.e. withstand) high flow speed of the fluid media 22. FIGS. 3A–3C shows a step in the preferred process including an additional post-sacrificial layer 60 release electroplating step. In this step, a nickel layer 74 is selectively electroplated at the bent hinges 34 to strengthen the hinges. Other electroplated materials may also be used. Referring first to FIG. 2G, before the removal of the copper sacrificial layer 60, the photoresist 70 is spun on and patterned to prevent the electroplated nickel 74 from growing on the resistive heater 12. Thus, the only metals preferably exposed at this stage are the (gold) bending regions 34 and the electrical leads of the supports 16. The sample chip 72 is then put in a copper etchant until the sacrificial layer 60 including copper is completely undercut (FIG. 2H). Afterwards, the sample chip 72 is removed from the etchant solution, thoroughly rinsed in deionized water, and immediately placed into a nickel plating bath.

Figure 4:
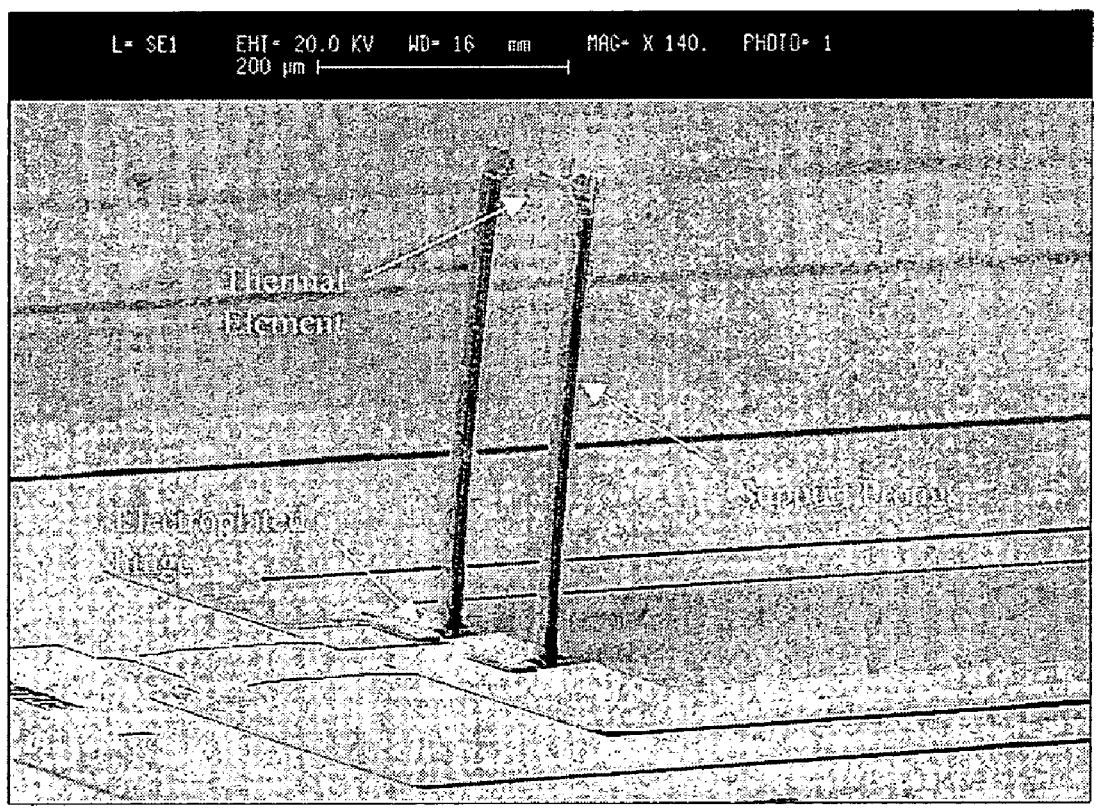
FIG. 4 is a scanning electron micrograph (SEM) image of a thermal sensor with an electroplated bending region.

The external magnetic field $H_{ext}$ is then applied, preferably in a direction normal to the substrate 14 (FIG. 3A) in parallel to lift the supports 16 out-plane. Next, the nickel layer 74 is locally electroplated onto the hinge 34 (FIG. 3B). A preferred plating time may be between 5–30 minutes, for example, at preferably between 1 and 1000 mA/cm$^2$ per device, depending on the size of the chip 72. This provides a nickel layer 74 at the hinge 34, preferably of a few $\mu$m in thickness, though this may be higher (on the order of tens of microns, for example). After plating is completed, the sample chip 72 is removed from the plating bath and the resist 70 is stripped (FIG. 3C). FIG. 4 shows an embodiment of the thermal sensor 10 after release and assembly.

Figure 5:
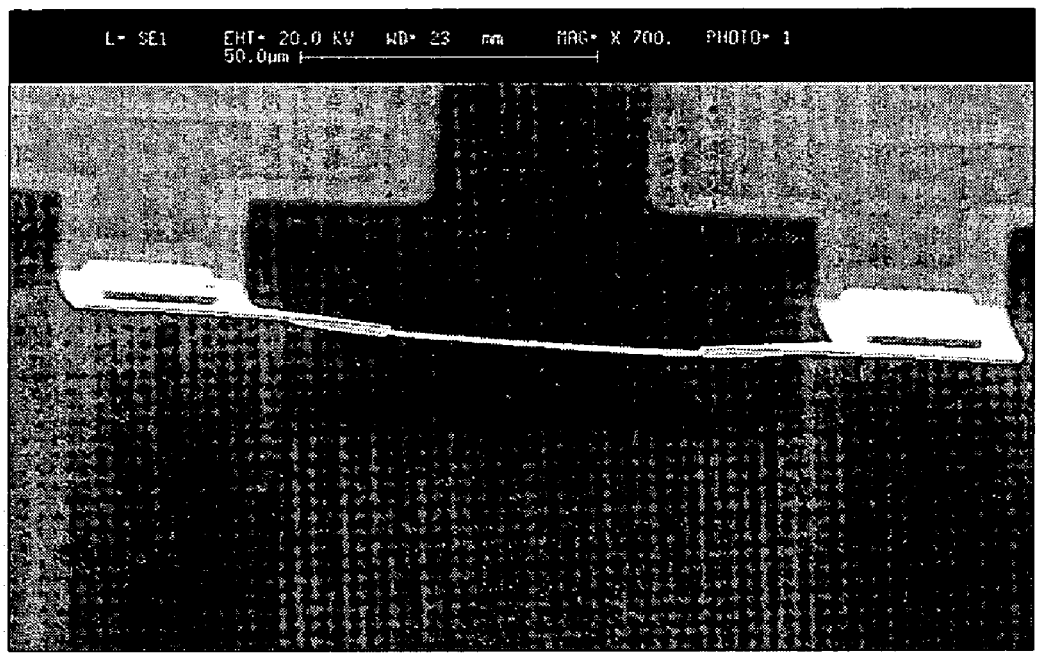
FIG. 5 is an SEM of an alternative thermal sensor without polyimide supports.

Alternatively, the thermal sensor 10 may be formed without fabrication of the polyimide supports 30, so that the supports 16 include only metal cantilever beams 28 (and the ferromagnetic material 68 used for assembly, unless it has been removed), and the non-silicon thin film 40 used for the resistive heater 12 is exposed to fluid media on both sides. A scanning electron microscope (SEM) micrograph of such a thermal sensor is shown in FIG. 5.

In operation of the thermal sensor 10, preferably as part of the chip 72, the supports 16, serving as electrical leads, are coupled, directly or indirectly, to the source 76. For example, the sensor 10 may be hooked up to a constant current or constant temperature driving circuit 76 via a pair of conductive paths 77. The output of the driving circuit 76 goes through a signal conditioner 78 (for amplification and linearization, for example) and finally to an A/D converter and readout 79 for determining fluid flow, for example. The output may also be measured by a multimeter.

Figure 7:
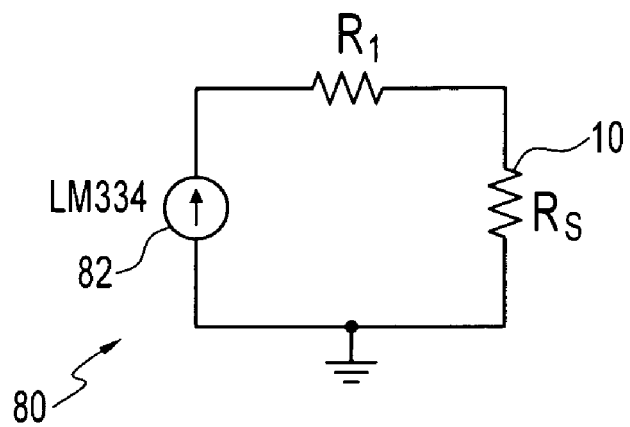
FIG. 7 is a schematic diagram of a circuit for constant current testing of a thermal sensor.

For example, FIG. 7 shows a nonlimiting example of a basic constant current driving circuit 80 for analyzing constant current response of the thermal sensor 12, including a constant current source 82 in series with a resistor R1, and the thermal sensor 10 as resistor $R_s$. As one non-limiting embodiment, an LM334 current source 82, in conjunction with a diode to reduce temperature dependence on the circuit, may be used for the source. Due to a positive TCR, the voltage across the resistive heater 12 decreases as the flow rate increases. The sensitivity of output voltage with respect to air velocity increases with increasing overheat ratio because of the increase in temperature difference between the resistive heater 12 and the fluid media 22.

Figure 8:
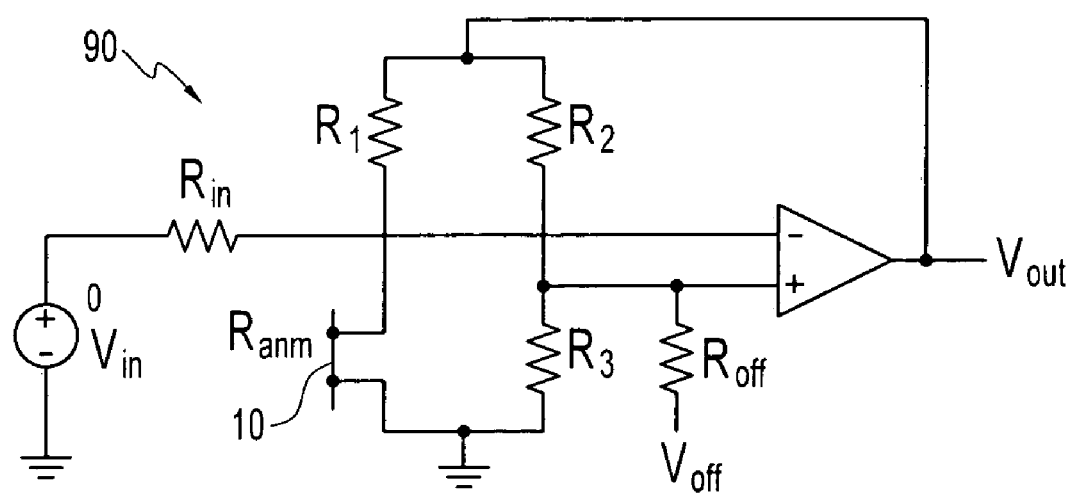
FIG. 8 is a schematic diagram of a circuit for constant temperature testing of a thermal sensor.
Figure 9:
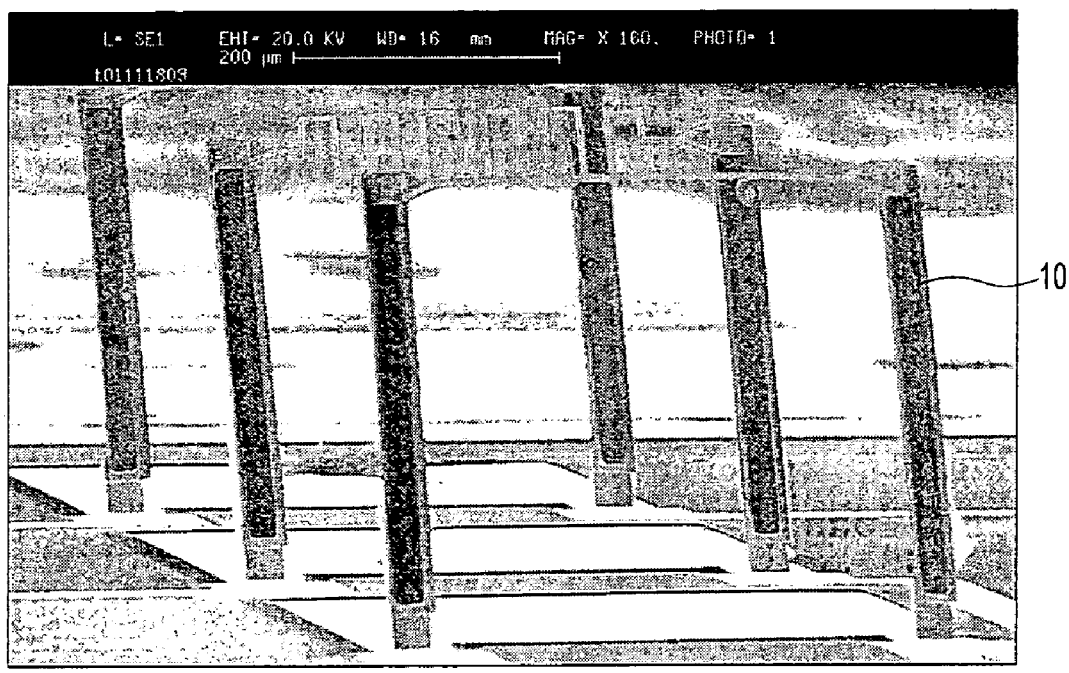
FIG. 9 is an SEM of an array of thermal sensors on a substrate.

FIG. 8 shows a nonlimiting example of a second basic circuit 90, used for constant temperature mode operation. In constant temperature mode operation, the resistance of the thermal sensor $R_{anm}$ is kept constant by a feedback op-amp circuit. The second basic circuit 90 includes a Wheatstone bridge, three legs of which contain resistors $R_1$, $R_2$, $R_3$, respectively, and one leg including the thermal sensor $R_{anm}$. The bridge circuit is balanced when $R_{anm}R_2=R_1R_3$. Resistor $R_3$ is a variable resistor used to set an overheat ratio.

In addition to the chip 72 having an individual thermal sensor 10, a chip according to an alternative embodiment of the present invention can also be realized in a large array format for distributed flow sensing. For example, FIG. 8 shows a triple-point thermal sensor array 100 including first, second, and third thermal sensors 10. The three-dimensional assembly process described above allows, among other benefits, assembly of multiple thermal sensors 10 in parallel using a globally applied magnetic field. However, the array 100 of thermal sensors 10 need not be parallel, co-planar, or even disposed on the same substrate 14. For example, a plurality of thermal sensors 10 having resistive heaters 12 disposed orthogonally to one another can be used to provide flow rates in three dimensions, and thus determine orientation of fluid flow.

Furthermore, by integrating a strain gauge into a base of the polymer support structure of the present thermal sensor, a tactical sensor can be produced as well. Arrays of such tactical sensors are possible for measuring water flow and airflow.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A thermal sensor for sensing fluid flow provided on a substrate, comprising:
    a resistive heater including a thin film metal, said resistive heater being suspended above the substrate by supports connected at one end to said substrate;
    each of said supports comprising a ductile metal beam bent along a joint near ends connected to said substrate;
    said supports being raised at a sufficient angle relative to the substrate to create a clearance between said resistive heater and said substrate.

2. The thermal sensor of claim 1 wherein the resistive heater is raised with respect to said substrate above an immediate velocity boundary layer of the fluid media over said substrate.

3. The thermal sensor of claim 1 wherein each of said supports further comprises a polymer support beam.

4. The thermal sensor of claim 1 wherein the thin film metal comprises a metal having a high temperature coefficient of resistance (TCR).

5. The thermal sensor of claim 1 further comprising a polymer support overlapping the thin film metal.

6. The thermal sensor of claim 1 wherein said supports comprise a pair of supports supporting first and second opposing ends of said resistive heater, each of said pair of supports being bent along a joint near the ends of said pair of supports connected to said substrate.

7. The thermal sensor of claim 1 wherein said supports comprise a pair of supports providing structural support for said resistive heater and an electrical connection to said resistive heater.

8. The thermal sensor of claim 7 further comprising:
    a source for supplying current to said resistive heater via said pair of supports.

9. A microscale anemometer, comprising:
    a thin film metal heater supported above a substrate and spanning a pair of ductile metal supports having a portion extending from the substrate;
    a source for supplying current to said thin film heater, the supports being coupled to said source via a portion of said supports extending above the substrate and in a direction out of plane with the portion of the supports extending from the substrate;

said heater being raised from said substrate to create a clearance for flow of a fluid media between said heater and the substrate;

said source, heater, and supports forming part of a circuit.

10. A chip comprising:
a substrate defining a plane;
a resistive heater including a thin-film metal;
a pair of supports connected to said substrate and said heater, said supports raising said heater with respect to said substrate to create a clearance for flow of a fluid media between said substrate and said heater;
said pair of supports and said heater being electrically connected;
said heater and said pair of supports being adhered to one another.

11. The chip of claim 10 wherein said heater further comprises a polymer support.

12. The chip of claim 11 wherein said heater comprises at least one of nickel, platinum, and chrome.

13. The chip of claim 10 wherein said heater and said pair of supports are manufactured using surface micromachining.

14. The chip of claim 10 further comprising:
a plurality of additional heaters and supports supporting said heaters over said substrate to create an array of sensors.

15. The chip of claim 14 wherein said array of sensors is co-planar.

16. The chip of claim 14 wherein said sensor and said additional sensors are each disposed orthogonally to one another.

17. A thermal sensor for sensing fluid flow provided on a substrate, comprising:
a thin film metal resistive heater suspended above the substrate by supports connected at one end to said substrate;
a polymer support for at least one of said supports and said resistive heater;
each of said supports comprising a metal beam;
said supports being raised at a sufficient angle relative to the substrate to create a clearance between said resistive heater and said substrate.

18. The thermal sensor of claim 17 wherein said polymer support is adhered to said resistive heater.

19. The thermal sensor of claim 17 wherein said polymer support is adhered to said supports.

20. The thermal sensor of claim 17 wherein said polymer comprises polyimide.

21. A microscale thermal sensor for sensing fluid flow provided on a substrate, comprising:
a thin film metal resistive heater suspended above the substrate by metal supports connected at one end to said substrate;
said supports being raised at a sufficient angle relative to the substrate to create a clearance between said resistive heater and said substrate;
said thin film heater having a thickness between hundreds of angstroms and several micrometers.

22. The microscale thermal sensor of claim 21 wherein said thin film heater is between 10 micrometers and 200 micrometers in length.

23. A chip comprising:
a substrate defining a plane;
a thin-film metal resistive heater;
a pair of supports connected to said substrate and said heater, said supports raising said heater with respect to said substrate to create a clearance for flow of a fluid media between said substrate and said heater;
said pair of supports and said heater being electrically connected;
further comprising a plurality of additional heaters and supports supporting said heaters over said substrate to create an array of sensors.

24. The chip of claim 23 wherein said array of sensors is co-planar.

25. The chip of claim 23 wherein said sensor and said additional sensors are each disposed orthogonally to one another.

* * * * *